United States Patent [19]

Prella et al.

[11] Patent Number: 5,253,568
[45] Date of Patent: Oct. 19, 1993

[54] CHEESE-MAKING TRAYS WITH REMOVABLE STORES

[75] Inventors: Giovanni Prella, Vercelli; Roberto Zugni, Abbiategrasso, both of Italy

[73] Assignee: Nestec S.A., Vevey, Switzerland

[21] Appl. No.: 851,216

[22] Filed: Mar. 13, 1992

[30] Foreign Application Priority Data

Mar. 30, 1991 [EP] European Pat. Off. ........ 91105119.1

[51] Int. Cl.⁵ .............. A23C 19/00; A01J 25/00; A01J 25/16; A01J 27/00
[52] U.S. Cl. ........................... 99/458; 99/456; 206/558; 206/564
[58] Field of Search ............ 99/452, 495, 456–459, 99/460, 465; 210/473, 477, 314, 464; 206/557, 558, 564; 220/4.26, 4.27

[56] References Cited

U.S. PATENT DOCUMENTS

| | | | |
|---|---|---|---|
| 1,679,004 | 7/1928 | Pinkel et al. | 99/452 |
| 1,963,878 | 6/1934 | Bagby | 99/452 |
| 2,324,636 | 7/1943 | Miollis | 99/452 |
| 2,657,994 | 11/1953 | Miollis | 99/456 |
| 2,710,450 | 6/1955 | Stasinos | 99/452 |
| 2,808,148 | 10/1957 | Kerney | 206/564 |
| 2,942,983 | 6/1960 | Sadler et al. | 99/452 |
| 3,836,684 | 9/1974 | Pontecorvo | 99/452 |
| 3,910,174 | 10/1975 | Nelles | 99/452 |
| 4,566,377 | 1/1986 | Van Buytene | 99/453 |
| 4,643,306 | 2/1987 | Ryan | 206/558 |

FOREIGN PATENT DOCUMENTS

| | | | |
|---|---|---|---|
| 235675 | 9/1987 | European Pat. Off. | |
| 2028318 | 12/1971 | Fed. Rep. of Germany | 99/452 |
| 2068168 | 8/1971 | France | 99/456 |
| 2252807 | 6/1975 | France | 99/452 |
| 2556559 | 6/1985 | France | 99/452 |
| 2594632 | 8/1987 | France | 99/452 |
| 101347 | 1/1954 | Norway | 99/458 |

*Primary Examiner*—Timothy F. Simone
*Attorney, Agent, or Firm*—Vogt & O'Donnell

[57] ABSTRACT

A tray for making cheese has a plate having upper and lower faces and a frame having walls having an inner surface connected to the plate about its periphery, thereby defining upper and lower tray portions. The frame has a slot positioned, respectively, adjacent each of the upper and lower plate faces for receiving a removable store which, upon insertion, is juxtaposed to a surface of the plate. Block molds may be positioned on the store, and a second tray may be placed above, so that the frame walls of the trays are in contact and so that the upper tray portion of the first tray and the lower tray portion of the second tray nest around the molds.

13 Claims, 1 Drawing Sheet

CHEESE-MAKING TRAYS WITH REMOVABLE STORES

BACKGROUND OF THE INVENTION

This invention relates to a two-sided tray for the production of cheeses which can be used with other similar trays to form a stack around block moulds and stores.

The production of cheeses of the soft type and the unpressed semi-cooked type can be mechanized by the use of perforated curd-distributing block moulds with no base or cover that are placed on filtering cloths (so-called "stores") which themselves rest on trays. The assemblies thus formed can be superposed to form stacks comprising, for example, up to 10 trays placed, for example, on a trolley which facilitates handling and reduces the amount of floor space occupied during draining of the curd.

The above-mentioned assemblies have to be able to be reversed to promote uniform draining which is generally done manually tray by tray. On the other hand, the curd is salted after draining, for example in brine, so that it would be desirable to be able to treat the assemblies in stacks by immersion in a bath of brine. In addition, on completion of salting, ripening also requires several reversals with successive changes or removal of the stores so that it would be advantageous if this could also be done integrally, i.e. without having to dismantle the stacks.

European Patent Application No. 0 235 675 relates to a double-sided tray with a store on each side which is designed to be stacked with block moulds and other similar trays, and which is intended for mechanization of the draining operations and enables the trays to be washed with the stores. With this known tray, the stability of a stack of trays and block moulds is not guaranteed because it is not the trays which are carriers, but rather outer clips which are fixed to the corners of the block moulds. In addition, the construction of the stacks is not very convenient because the clips of the block moulds have to fit into corresponding slots in the trays. In addition, the stores are not detachable so that the trays lack the flexibility required for use in ripening cellars. Finally, the structure of the trays is complicated which does not facilitate their cleaning.

SUMMARY OF THE INVENTION

The problem addressed by the present invention was to provide a tray which would enable draining and salting to be mechanized while, at the same time, facilitating ripening of the cheeses by handling in stacks.

To this end, the tray according to the invention is characterized in that it comprises a plate designed to support the block mould, a frame externally surrounding the plate of which two opposite sides are formed with slots and stores which can be detached without dismantling of the stack and which are arranged on the upper and lower faces of the plate and, after stacking, the trays rest on one another through the sides of the frames and are kept superposed by nesting around the block moulds.

BRIEF DESCRIPTION OF THE INVENTION

In a preferred embodiment of the tray of the present invention, the stores are held on the faces of the plate in grooves formed in the thickness of the inner walls of the sides of the frame formed with slots. The one-piece stores are thus able to slide in the grooves and can be removed or put in place without having to dismantle or reassemble a stack of trays.

In a tray/store/block assembly, the plate of the tray is preferably fixed to the sides of the frame at approximately mid-height and the height of these sides correspond approximately to twice the height of the block moulds. This creates a space between a block mould and the lower store associated with the overlying tray.

A block mould comprises rows and lines of moulds. The plate of a tray is advantageously perforated between the rows and/or lines of moulds of the block mould to facilitate draining. The slots formed in the sides of the frame of the tray are advantageously elongate in shape and are situated opposite the rows of moulds of the block mould.

These openings and spaces ensure good ventilation of the trays which in turn establishes a uniform atmosphere within a stack during ripening and a circulation of the brine with no preferential flow during immersion salting.

BRIEF DESCRIPTION OF THE DRAWINGS

One example of embodiment of the invention is described in detail in the following with reference to the accompanying drawings, wherein.

DETAILED DESCRIPTION OF THE DRAWINGS

Figure 1:
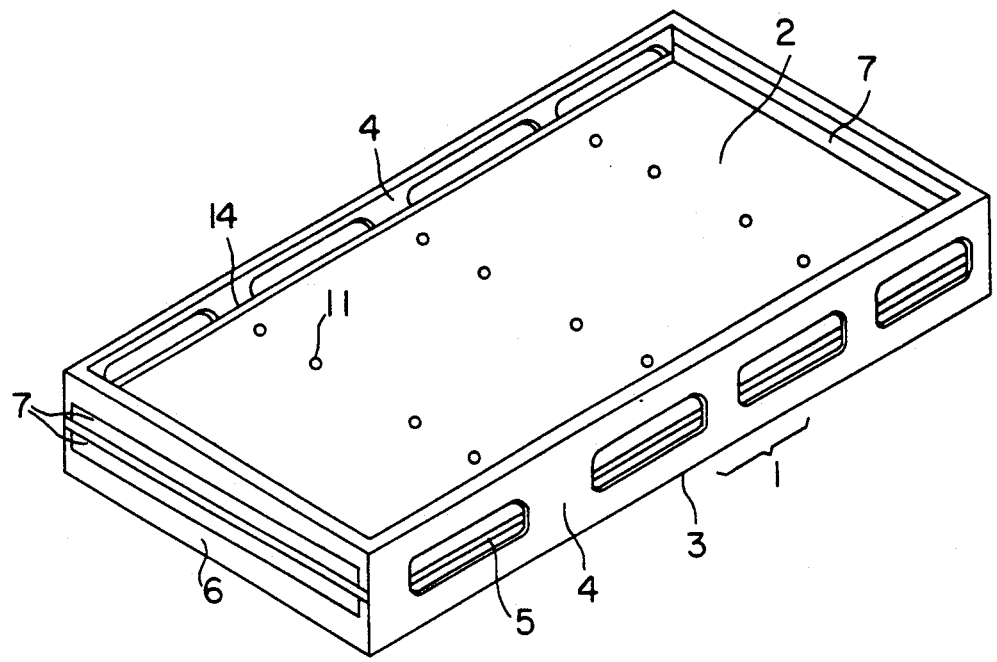
FIG. 1 is a perspective view of a reversible tray for the production of cheeses without the stores.

As shown in FIG. 1 tray 1 comprises a rectagular plate 2 and a frame 3 surrounding the plate. The large sides 4 of the frame are formed with oblong slots 5 arranged as it were "astride" the plate 2. Slots 7 are formed in the small sides 6 of the frame on either side of the plate 2.

Figure 4:
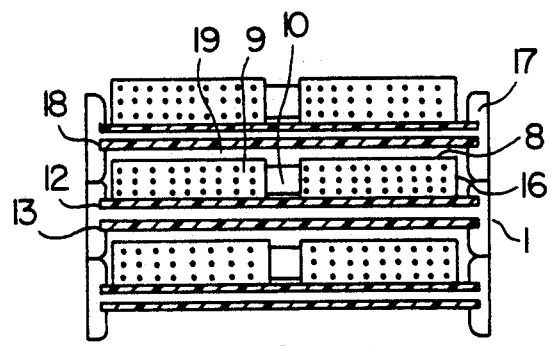
FIG. 4 is a diagrammatic view, partly in vertical section, of a stack of trays, stores and block moulds using the trays shown in FIG. 1.

As shown in FIGS. 1 and 4, plate 2 is designed to support a perforated block mould 8 with no base or cover which comprises eight moulds 9 square in shape and arranged in two lines and four rows interconnected by crossmembers 10. The plate 2 is drilled with drainage holes 11 between the rows of moulds.

Figure 2:
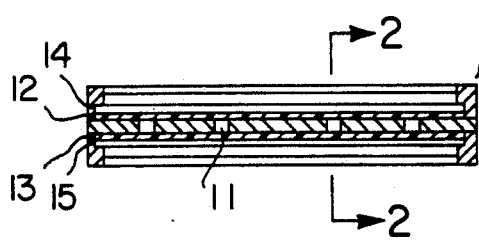
FIG. 2 is a cross-section through this tray with the stores on the line 1—1 in FIG. 3.
Figure 3:
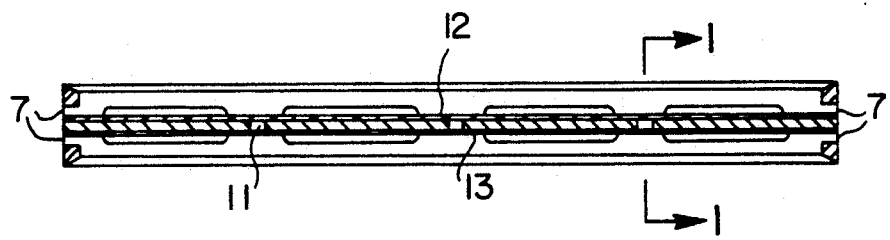
FIG. 3 is a longitudinal section through the same tray on the line 2—2 in FIG. 2.

As shown in FIGS. 2 and 3, one-piece stores 12,13 are held on the upper and lower faces of the plate 2 in grooves 14,15 formed in the thickness of the inner faces of the large sides 4 of the frame 3 over the entire length of those sides. The stores 12,13 are detachable and are desiged to be placed in position or removed through the slots 7 by sliding in the grooves 14,15. The assembly formed by the tray 1 and the stores 12,13 is symmetrical in relation to the plate 2 and is thus reversible.

Thus, the tray of the present invention comprises a plate having upper and lower faces and a frame having walls having an inner surface connected to the plate about a periphery of the plate to define upper and lower tray portions, the frame having a slot positioned, respectively, adjacent each of the upper and lower faces of the plate for receiving a removable store which, upon insertion through a slot, is juxtaposed to a face of the plate.

In order to form a stack of reversible trays, as shown in FIG. 4, each tray 1 is provided with an upper store 12 and a lower store 13. A block mould 8 is placed on the store 12 and fits into the frame of the tray with a certain play 16. The block mould receives eight cheeses (one per mould 9) in the course of production. On each assembly thus formed is placed the immediately upper tray 17 which fits onto the block mould associated with the first tray. In view of the minimal play 16, the frame of the tray 17 rests on the frame of the tray 1, which ensures high stability of the stack so that it can be assembled very easily. In addition, since the trays do not rest on the block moulds comprising an assembly of perforated moulds with thinner walls joined together by bridges of material, but directly on the other trays through their frames which have thicker walls and a construction that ensures high rigidity, there is no risk of deformation of the trays in the stack or of the stack itself during the various handling operations.

Thus, the multi-tray assembly of the present invention comprises a first tray and at least a second tray, each tray comprising a plate having upper and lower faces and a frame having walls having an inner surface connected to the plate about a periphery of the plate to define upper and lower tray portions, the frame having a slot positioned, respectively, adjacent each of the upper and lower faces of the plate for receiving a removable store which, upon insertion through a sot, is juxtaposed to a face of the plate; a store juxtaposed to the upper surface of the first plate; and a plurality of block molds positioned on the store, wherein the second tray is positioned above the first tray so that the frame walls of the first and second trays are in contact and so that the upper tray portion of the first tray and the lower tray portion of the second tray nest around the block molds.

For reversal, course necessary to place a last empty mould, but with its lower store, on the top of the stack.

When the stack of trays, stores and block moulds thus formed is reversed, the block mould 8 for example rests on the tray 17 which becomes the immediately lower tray. The cheeses present in the moulds 9 of the block mould 8 are thus placed on the store 18, i.e. on a supporting surface identical with that preceding reversal. The store 12 is relieved of any load and can thus be removed for cleaning, for example during ripening, and subsequently replaced to receive the block mould and the cheeses during the next reversal or may even be removed if ripening is to be continued without stores. Accordingly, ripening can be carried out in stacks without any need for the stacks to be dismantled and reassembled for each reversal.

During the draining phase, drainage and ventilation are promoted by the openings 5, 7 and 11. For salting, for example by immersion of the stacks in a bath of brine, the openings 5 and 7 and the space 19 (FIG. 4) situated between the upper edge of the block moulds 9 and the store 18 provide for good circulation of the brine between the cheeses so that uniform salting conditions are established.

The trays, block moulds and stores are preferably made of plastic. On completion of ripening and after removal of the moulds and cheeses, the various elements can be automatically cleaned and optionally sterilized.

We claim:

1. A tray for draining and ripening cheese comprising a plate having upper and lower faces and a frame having walls having an inner surface connected to the plate about a periphery of the plate to define upper and lower tray portions, the frame having a slot positioned, respectively, adjacent each of the upper and lower faces of the plate for receiving a removable store which, upon insertion through a slot, is juxtaposed to a face of the plate.

2. A tray according to claim 1 wherein opposed walls of the frame have elongated grooves in their inner surfaces for receiving the stores.

3. A tray according to claim 1 wherein the frame is connected to the plate at approximately mid-height of the walls of the frame.

4. A tray according to claim 1 wherein the plate is perforated.

5. A tray according to claim 1 further comprising a store juxtaposed to a face of the plate.

6. A tray according to claim 5 further comprising a plurality of block molds positioned on the store.

7. A tray according to claim 6 wherein the plate is perforated between the adjacently positioned molds.

8. An apparatus for draining and ripening cheese comprising:

a first tray and at least a second tray, each tray comprising a plate having upper and lower faces and a frame having walls having an inner surface connected to the plate about a periphery of the plate to define upper and lower tray portions, the frame having a slot positioned, respectively, adjacent each of the upper and lower faces of the plate for receiving a removable store which, upon insertion through a slot, is juxtaposed to a face of the plate; a store juxtaposed to the upper surface of the first plate; and a plurality of block molds positioned on the store, wherein the second tray is positioned above the first tray so that the frame walls of the first and second trays are in contact and so that the upper tray portion of the first tray and the lower tray portion of the second tray nest around the block molds.

9. An apparatus according to claim 8 wherein opposed walls of the frames have elongated grooves in their inner surfaces for receiving stores.

10. An apparatus according to claim 8 wherein the frames are connected to the plates at approximately mid-height of the walls of the frames.

11. An apparatus according to claim 8 wherein the plates of the trays are perforated.

12. An apparatus according to claim 11 wherein the plates are perforated between the adjacently positioned molds.

13. An apparatus according to claim 8 wherein the molds have a height approximately twice the height of the frame walls.

* * * * *